C. R. ABBOTT.
Safety Car Platform.
No. 68,543.
Patented Sept. 3, 1867.
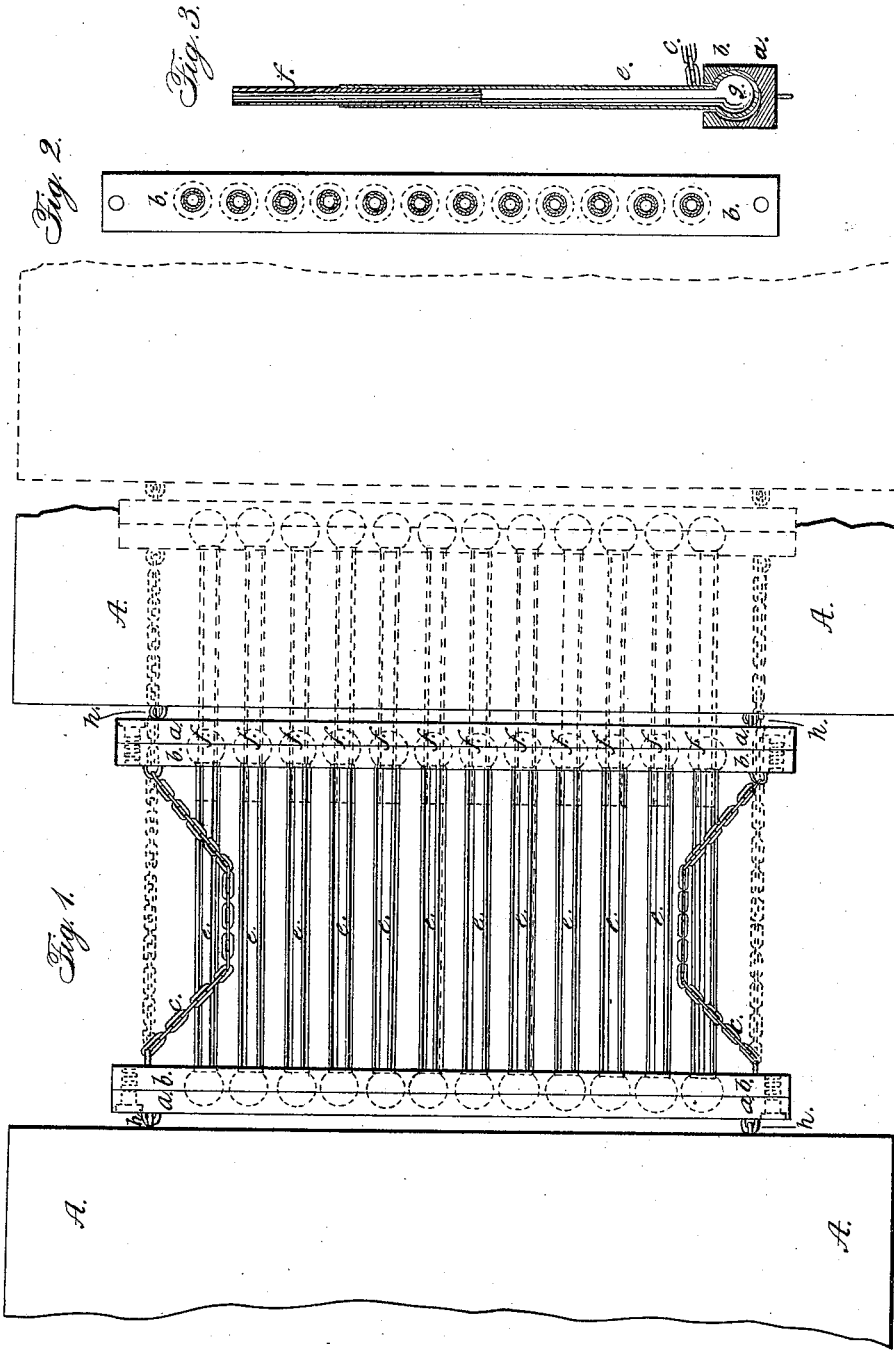
Witnesses:
Inventor:
Charles R. Abbot.
by Atty. J. C. Clayton.

United States Patent Office

CHARLES R. ABBOT, OF ELMIRA, NEW YORK.

Letters Patent No. 68,543, dated September 3, 1867.

---

IMPROVED SAFETY CAR-PLATFORM.

---

*The Schedule referred to in these Letters Patent and making part of the same.*

---

TO ALL WHOM IT MAY CONCERN:

Be it known that I, CHARLES R. ABBOT, of Elmira, in the county of Chemung, and in the State of New York, have invented certain new and useful improvements in "Safety Ways for Connecting Railway Cars;" and I do hereby declare that the following is a full, clear, and exact description thereof, reference being had to the accompanying drawings and to the letters of reference marked thereon, in which—

Figure 1 is a plan view of my invention, with sliding tubes closed to their shortest length. The red lines in same figure show the tubes drawn out to their furthest extent, and also a section of two cars to which the sliding ways are attached by any suitable means.

Figure 2 is a section through the cross-heads $a\,b$, exposing the ends of the sliding bars or swivel-joints.

Figure 3 is a section longitudinally through $a\,b$, showing the insertion of the sliding tube $c$, and also showing tubes $e$ and $f$.

The nature of my invention consists in forming a sliding or telescopic safety railway-platform between railroad cars, for the safety of passengers or brakesmen riding on railroads, as hereinafter described.

To enable others skilled in the art to make and use my invention, I will proceed to describe its construction and operation.

In the construction of my invention, in fig. 1, A A represent the ends of two railroad cars, shown in section, to which, by hooks or hinges $h\,h\,h\,h$, are attached the heads $a\,a$ of my invention, thus forming a platform of great safety, by which the two cars are connected. The heads $a\,b$ and $a\,b$ are formed of two pieces of wood, (iron may be used if preferred,) and the inner portion of the holes through which the bars $e$ and $f$ pass are enlarged or countersunk to receive the heads of the tubes $e$ and $f$, as seen in fig. 3, at $a\,b$, or they may be fastened any convenient way to accomplish the purpose. In fig. 1 the manner of setting the ends of the bars $e$ and $f$, is seen in dotted lines, in the head-pieces $a\,b$. These tubes, in the drawings, are made of tubes $e$, into which bars, or tubes, or rods $f$ slide; and the tubes $e$ can be made flexible at the ends where bars $f$ enter by the swivel-joints $g$, to allow for any lateral motion of the cars; and the sliding motion is to allow for the irregular motion of the cars while running, and to prevent rigidity in the line of the cars, as the bars will compress or expand as required. The socket-joints $g$ may be packed with rubber in order to prevent noise. The chains $c\,c$ are attached to the heads $b\,b$ by hooks $h\,h$, and are intended to prevent the tubes $f$ from slipping out of the socket-tubes $e$, as the chain is shorter than the slide of the tubes, and tightens before the tubes extend to their full length. In the dark lines the ways are pressed close up to their shortest space, and the red lines show the ways fully extended, and the chains tightened, so as to check any further expansion.

In fig. 2 the ends of the tubes are shown, the dotted lines indicating the heads on the ends of the tubes, by which they are firmly held in place, whilst the smaller circles indicate the ends of the sliding bars.

In fig. 3, $a\,b$ show sections of the head-pieces, exposing the enlarged ends of the tube-bar $e$. This is a tube into which bar $f$ enters, and slides back and forward to accommodate the motion of the cars. Only a section of tubes $f$ is shown here, only enough to show its connection with the tube-bar $e$. The sides of the sliding ways can be protected by a device of a similar character with the sliding ways, and which will operate in the same manner, when placed in a vertical position, as when placed longitudinally between the cars. When thus constructed a complete safety way between the cars is furnished.

In the operation of my invention, having constructed my sliding safety ways, and attached them between the cars, as specified, it will be seen that flexible tubes, fastened in the cross-heads $a\,b$, will allow for any required motion, either laterally or back and forth, as the bars $f$ have sufficient play in tubes $e$ to allow for any motion of the cars, and to which they readily accommodate themselves. Further, the ability to slide in and out is not prevented by the weight of any person standing on the ways, in passing from one car to another. The same number of bars will not be needed at the sides as are needed on the bottom. Three bars will be enough to prevent persons from falling off; if not, more can be put on for security, if required. By this invention I am able to make a very efficient and secure safety way between freight or passenger railroad cars.

Having thus fully described the construction and operation of my invention, what I claim as new, and desire to secure by Letters Patent, is—

The safety way herein described, when composed of the sliding tubes or bars $e$ and $f$, with socket-joints $g$, and cross-head $a\,b$, substantially as and for the purposes set forth.

In testimony that I claim the above-described invention I have hereunto signed my name this 22d day of March, 1867.

C. R. ABBOT.

Witnesses:
   A. WYCKOFF,
   W. MENOIN.